United States Patent Office 3,207,767
Patented Sept. 21, 1965

3,207,767
19-ALKYL ANDROSTANES
Albert Bowers, Mexico City, Mexico, assignor to Syntex Corporation, Panama, Panama, a corporation of Panama
No Drawing. Filed Dec. 20, 1962, Ser. No. 246,016
23 Claims. (Cl. 260—397.4)

The present invention relates to novel cyclopentanophenanthrene derivatives and to a process for the production thereof.

More particularly, the present invention relates to novel 19-lower alkyl-10α-androstan-17β-ol-3-one derivatives.

The novel compounds of the present invention are represented by the following formulae:

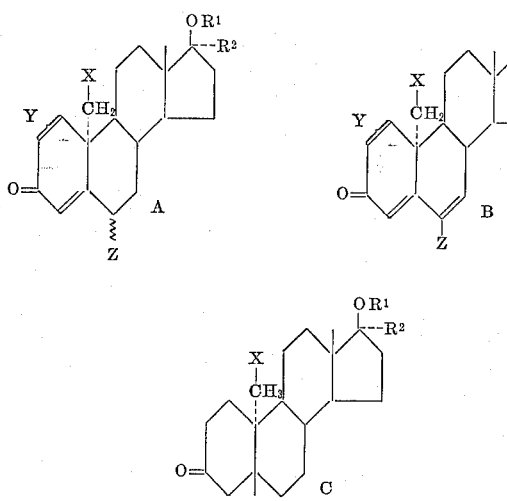

In the above formulae, $R^1$ represents hydrogen or a hydrocarbon carboxylic acyl group of less than 12 carbon atoms; $R^2$ represents hydrogen, lower alkyl, lower alkenyl or lower alkinyl; Z represents hydrogen, methyl, chlorine or fluorine, all having α or β configurations in formula A; Y represents a double bond or a saturated linkage between C-1 and C-2; and X represents a lower alkyl group.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, amino-acetate, and β-chloropropionate.

The compounds represented by the above formula have anabolic-androgenic properties, and inhibit the production of pituitary gonadotrophic hormones and A.C.T.H. In addition, they exhibit antiestrogenic activity and lower the blood, liver and adrenal cholesterol levels. Furthermore, they are very useful in the control of fertility and psychotic conditions, and stimulate the appetite.

The novel unsaturated compounds of the present invention are prepared by the process exemplified as follows:

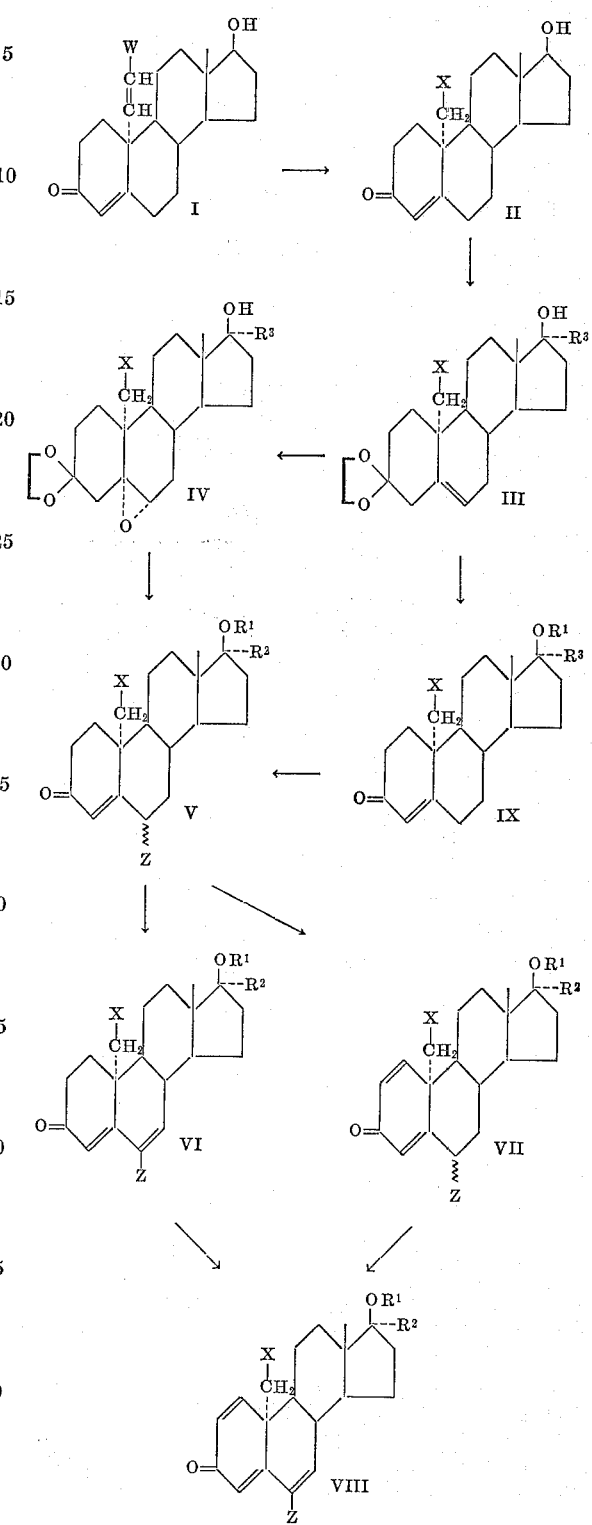

In the above formulas, $R^1$, $R^2$, X and Z have the same meaning as previously set forth; $R^3$ represents hydrogen, lower alkyl or lower alkinyl; and W represents hydrogen or lower alkyl.

The starting compound (*t*) of the above process, which is a 19-(methylene or lower alkylidene)-Δ-10α-androsten-17β-ol-3-one is prepared according to my copending U.S. patent application Serial No. 246,018, filed December 20, 1962, from 19-hydroxy-10α-testosterone [Sondheimer et al., Tetrahedron Letters No. 22, 38, (1960)] by conventional reduction to Δ⁴-10α-androstene-3β, 17β, 19-triol, selective acetylation to the corresponding 3,17-diacetate, oxidation to Δ⁴-10α-androstene-3β, 17β-diol-19-al diacetate, treatment with a lower alkyl triphenyl-phosphonium bromide to give the corresponding 19-lower alkylidene-Δ⁴-10α-androstene-3β,17β-diol and finally selective oxidation of the allylic 3β-hydroxy to the desired Δ⁴-3-ketone.

In practicing the process just outlined, the starting compound (*i*) is treated with hydrogen in the presence of a suitable catalyst, such as 5% palladium on carbon, to give the corresponding 19-lower alkyl-5β,10α-androstan-17β-ol-3-one, which upon bromination in the presence of hydrogen bromide with approximately 1 mol equivalent of bromide followed by treatment with γ-collidine at reflux temperature for approximately 90 minutes, yields the corresponding 19-lower alkyl-Δ⁴-10α-androsten-17β-ol-3-one (II).

The 17β-hydroxy Δ⁴-3-ketones (II) upon reaction with ethylene glycol, in the presence of p-toluenesulfonic acid yield the corresponding 3-cycloethylenedioxy-17β-hydroxy-Δ⁵-10α-androsten compounds which are oxidized to the corresponding 17-ketones, preferably with chromium trioxide in pyridine. The latter 17-ketones are treated with a lower alkyl magnesium halide, such as methyl magnesium bromide, in a suitable anhydrous solvent, preferably benzene, to give the corresponding 3-cycloethylenedioxy-17α-lower alkyl-19-lower alkyl-Δ⁵-10α-androsten-17β-ol compounds (III: R³=lower alkyl), or with a current of a lower alkine-1 in the presence of potassium t-amyloxide, to produce the corresponding 3-cycloethylenedioxy-17α-lower alkinyl-19-lower alkyl-Δ⁵-10α-androsten-17β-ol derivatives (III: R³=lower alkinyl).

The 3-cycloethylenedioxy-19-lower alkyl-Δ⁵-10α-androsten-17β-ol compounds (II) are hydrolyzed conventionally in an acid medium, to give the corresponding 19-lower alkyl-Δ⁴-10α-androsten-17β-ol-3-one steroids (IX).

The 3-cycloethylenedioxy-19-lower alkyl-Δ⁵-10α-androsten-17β-ol derivatives (III) upon treatment with an organic peracid, such as monoperphthalic acid, in a suitable solvent, e.g. chloroform, give the corresponding 3-cycloethylenedioxy-19-lower alkyl-5α,6α-oxido derivatives (IV).

Upon reaction of the latter 3-cycloethylenedioxy-5α,6α-oxido compounds with methyl magnesium bromide in an inert solvent, such as ether or tetrahydrofuran, followed by conventional working up and treatment of the resulting residues with a mineral acid such as 8% sulfuric acid, and thereafter with thionyl chloride in pyridine at about −10° C. for approximately 4 minutes, there are obtained the corresponding 19-lower alkyl-6β-methyl-Δ⁴-10α-androsten-17β-ol-3-one derivatives (V: Z=β-methyl). These 6β-methyl derivatives are converted into the corresponding 6α-methyl derivatives (V: Z=α-methyl) by treatment with an alkali metal hydroxide.

When treating the 3-cycloethylenedioxy-5α,6α-oxido compounds (IV) with anhydrous hydrogen chloride in a suitable organic solvent, e.g. ethyl acetate or acetic acid, there are produced the corresponding 6α-chloro-19-lower alkyl-Δ⁴-10α-androsten-17β-ol-3-one derivatives (V: Z=α-chlorine).

Upon reaction of the 3-cycloethylenedioxy-5α,6α-oxido compounds (IV) with anhydrous hydrogen fluoride, preferably in the presence of boron trifluoride etherate, followed by treatment with hydrogen chloride, there are produced the corresponding 6α-fluoro-19-lower alkyl-Δ⁴-10α-androsten-17β-ol-3-one derivatives (V: Z=α-fluorine).

The 19-lower alkyl-Δ⁴-10α-androsten-17β-ol-3-one derivatives (II) are treated with ethyl orthoformate in the presence of p-toluenesulfonic acid and in an inert solvent, thus affording the corresponding 19-lower alkyl-3-ethoxyoxy-Δ³,⁵-10α-androstadien-17β-ol derivatives, which upon reaction with approximately 1 molar equivalent of an N-chloro amide or imide, such as N chlorosuccinimide, in the presence of sodium acetate and acetic acid, yield the corresponding 6β-chloro-19-lower alkyl-Δ⁴-10α-androsten-17β-ol-3-one derivatives (V: Z=β-chlorine).

The aforesaid 19-lower alkyl-3-ethoxy-Δ³,⁵-10α-androstadien-17β-ol derivatives are treated with perchloryl fluoride in dimethylformamide to produce the corresponding 6β-fluoro-19-lower alkyl-Δ⁴-10α-androsten-17β-ol-3-one derivatives (V: Z=β-fluorine).

The 19-lower alkyl-17α-alkinyl-Δ⁴-10α-androsten-17β-ol-3-one compounds of the present invention (V: R²=alkinyl) are converted into the corresponding 19-lower alkyl-17α-alkenyl-Δ⁴-10α-androsten-17β-ol-3-one derivatives (V: R²=alkenyl) by hydrogenation with approximately 1 molar of hydrogen, in pyridine solution, in the presence of a suitable catalyst, such as 2% palladium on calcium carbonate at room temperature and under a pressure of about 1 atmosphere.

The 19-lower alkyl-Δ⁴-10α-androsten-17β-ol-3-one compounds of the present invention (V) upon treatment with ethyl orthoformate in an inert solvent, e.g. dioxane, and in the presence of p-toluenesulfonic acid, furnish the corresponding 19-lower alkyl-3-ethoxy-Δ³,⁵-10α-androstadiene derivatives, which are treated with approximately 1 molar equivalent of 2,3-dichloro-5,6-dicyano-1,4-benzoquinone, in the presence of a catalytic amount of acid and in an inert solvent, to give the corresponding 19-lower alkyl-Δ⁴,⁶-10α-androstadien-17β-ol-3-one derivatives (VI).

When treating the 19-lower alkyl-Δ⁴-10α-androsten-17β-ol-3-one compounds (V) with 2,3-dichloro-5,6-dicyano-1,4-benzoquinone in an inert solvent, such as dioxane, preferably at reflux temperature, for a period of time of about 10 hours, there are produced the corresponding 19-lower alkyl - Δ¹,⁴-10α-androstadien - 17β-ol-3-one compounds (VII). The aforesaid Δ⁴,⁶-androstadiene compounds (VI) are converted into the corresponding Δ¹,⁴,⁶-10α-androstatriene derivatives (VIII) by further treatment with 2,3-dichloro-5,6-dicyano-1,4-benzoquinone, under the same conditions as specified hereinbefore for the production of the Δ¹,⁴-derivatives (VI).

The novel saturated compounds of the present invention, are prepared by the process illustrated by the following scheme:

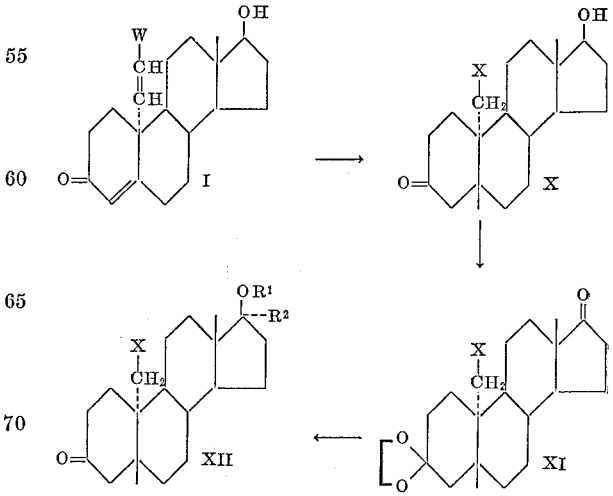

In the above formulae W, X, $R^1$ and $R^2$ have the same meaning as set forth hereinbefore. In proceeding in accordance with the latter scheme, the starting compound (I), obtained as was delineated previously, is hydrogenated in the presence of a suitable catalyst, such as 5% palladium on carbon, thus affording the corresponding 19-lower alkyl-5β, 10α-androstan-17β-ol-3-one (X), which upon reaction with ethylene glycol in the presence of p-toluenesulfonic acid, followed by oxidation of the product, preferably with chromium trioxide in pyridine yields the corresponding 3-cycloethylenedioxy-19-lower alkyl-5β, 10α-androstan-17-one (XI).

The latter 17-ketone (XI) is treated with a lower alkyl magnesium halide, such as methyl magnesium bromide, in a suitable anhydrous solvent, preferably benzene, to give the corresponding 3-cycloethylenedioxy-17α-lower alkyl-19-lower alkyl-5β,10α-androstan-17β-ol, or with a current of a lower alkine-1 in the presence of potassium t-amyloxide, to produce the corresponding 3-cycloethylenedioxy-17α-lower alkinyl-19-lower alkyl-10α-androstan-17β-ol. The 3-cycloethylenedioxy-10α-androstan-17β-ol derivatives are converted into the corresponding 3-ketones (XII) by conventional treatment in an acid medium.

The 17α-lower alkinyl-19-lower alkyl-5β,10α-androstan-17β-ol-3-one compounds (XII: $R^2$=lower alkinyl) upon hydrogenation with approximately 1 molar equivalent of hydrogen, in pyridine solution, in the presence of a suitable catalyst, such as 2% palladium on calcium carbonate at room temperature and under a pressure of about 1 atmosphere, produce the corresponding 17α-lower alkenyl-19-lower alkyl-5β,10α-androstan-17β-ol-3-one derivatives (XII: $R^2$=lower alkenyl).

The compounds of the present invention having a secondary hydroxyl, namely the 17α-unsubstituted-17β-alcohols, are conventionally acylated in pyridine with an acylating agent, such as an anhydride or an acyl chloride derived from hydrocarbon carboxylic acids of the previously defined type to produce the corresponding acylates.

The compounds of the present invention having a tertiary hydroxyl present in the molecule, i.e., the 17α-substituted-17β-alcohols, are conventionally esterified in the presence of p-toluenesulfonic acid with an acylating agent, such as acetic anhydride or caproic anhydride, thus affording the corresponding esters.

The following specific examples serve to illustrate, but are not intended to restrict the scope of the present invention:

*Example I*

A suspension of 0.5 g. of 5% palladium on carbon catalyst in 50 cc. of methanol was hydrogenated for 30 minutes. A solution of 2 g. of 19-methylene-Δ⁴-10α-androsten-17β-ol-3-one (obtained according to my copending U.S. pat. appl. Ser. No. 246,018 filed December 20, 1962) in 200 cc. of methanol was added to the catalyst and stirred under a hydrogen atmosphere until the uptake of hydrogen ceased. After removal of the catalyst by filtration the solution was evaporated and the crude residue was purified by chromatography on alumina followed by crystallization from methylene-chloride-hexene, thus giving 19-methyl-5β,10α-androstan-17β-ol-3-one (Compound No. 1). 19-ethylidene-Δ⁴-10α-androsten-17β-ol-3-one (obtained in accordance with the aforesaid patent application) was treated by the same procedure, to give 19-ethyl-5β,10α-androstan-17β-ol-3-one (Compound No. 2).

*Example II*

A solution of 1.1 mol equivalents of bromine in 15 cc. of glacial acetic acid was added dropwise to a solution of 1 g. of compound No. 1 in 25 cc. of acetic acid, containing a few drops of 4 N hydrogen bromide in acetic acid. After five hours at room temperature, the mixture was poured into ice water and the precipitated dibromo derivative was collected, washed well with water, and dried. The dried material was refluxed for 90 minutes with 4.5 cc. of γ-collidine and 4.5 cc. of 2,4-lutidine under anhydrous conditions. The solution was cooled, the precipitate removed and the filtrate was diluted with ether, washed with dilute hydrochloric acid, sodium carbonate solution and water. The dried extract was evaporated and the residue chromatographed on neutral alumina. Crystallization of the solid fractions from acetone-hexane afforded, 19-methyl-Δ⁴-10α-androsten-17β-ol-3-one (Cpd. No. 3). The compound No. 2 was treated by the same procedure, thus giving 19-ethyl-Δ⁴-10α-androsten-17β-ol-3-one (Cpd. No. 4).

*Example III*

A mixture of 5 g. of compound No. 3, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3-cycloethylenedioxy-19-methyl-Δ⁵-10α-androsten-17β-ol (Cpd. No. 5).

Upon treatment of compound No. 4 by the same procedure, there was obtained 3-cycloethylenedioxy-19-ethyl-Δ⁵-10α-androsten-17β-ol (Cpd. No. 6).

*Example IV*

A solution of 6 g. of compound No. 5 in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3-cycloethylenedioxy-19-methyl-Δ⁵-10α-androsten-17-one.

The compound No. 6 was treated according to the latter procedure, thus giving 3-cycloethylenedioxy-19-ethyl-Δ⁵-10α-androsten-17-one.

*Example V*

A solution of 5 g. of 3-cycloethylenedioxy-19-methyl-Δ⁵-10α-androsten-17-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3-cycloethylenedioxy-17α,19-dimethyl-Δ⁵-10α-androsten-17β-ol (Cpd. No. 7). 3-cycloethylenedioxy-19-ethyl-Δ⁵-10α-androsten-17-one, was treated by the same procedure, thus yielding 3-cycloethylenedioxy-17α-methyl-19-ethyl-Δ⁵-10α-androsten-17β-ol (Cpd. No. 8).

*Example VI*

A solution of 1 g. of 3-cycloethylenedioxy-19-methyl-Δ⁵-10α-androsten-17-one in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave a product, which upon recrystallization from acetone-hexane afforded 3-cycloethylenedioxy-17α-ethinyl-19-methyl-Δ⁵-10α-androsten-17β-ol (Cpd. No. 9). Upon treatment of 3-cycloethylenedioxy-19-ethyl-Δ⁵-10α-androsten-17-one by the same procedure, there was obtained 3-cycloethylenedioxy-17α-ethinyl-19-ethyl-Δ⁵-10α-androsten-17β-ol (Cpd. No. 10).

Example VII

A solution of 500 mg. of compound No. 7 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 17α,19-dimethyl-$\Delta^4$-10α-androsten-17β-ol-3-one (Cpd. No. 11).

The compounds Nos. 8, 9 and 10, were treated by the same procedure, thus yielding respectively:

Cpd.
No.
(12)—17α-methyl-19-ethyl-$\Delta^4$-10α-androsten-17β-ol-3-one.
(13)—17α-ethinyl-19-methyl-$\Delta^4$-10α-androsten-17β-ol-3-one.
(14)—17α-ethinyl-19-ethyl-$\Delta^4$-10α-androsten-17β-ol-3-one.

Example VIII

A solution of 2.5 g. of 3-cycloethylenedioxy-19-methyl-$\Delta^5$-10α-androsten-17β-ol (Cpd. No. 5) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone - hexane gave 3-cycloethylenedioxy - 19-methyl-5α,6α-oxido-10α-androstan-17β-ol (Cpd. No. 15).

The compounds Nos. 6 to 10 inclusive, were treated following the above procedure, thus furnishing respectively:

Cpd.
No.
(16)—3-cycloethylenedioxy-19-ethyl-5α,6α-oxido-10α-androstan-17β-ol.
(17)—3-cycloethylenedioxy-17α,19-dimethyl-5α,6α-oxido-10α-androstan-17β-ol.
(18)—3-cycloethylenedioxy-17α-methyl-19-ethyl-5α,6α-oxido-10α-androstan-17β-ol.
(19)—3-cycloethylenedioxy-17α-ethinyl-19-methyl-5α,6α-oxido-10α-androstan-17β-ol.
(20)—3-cycloethylenedioxy-17α-ethinyl-19-ethyl-5α,6α-oxido-10α-androstan-17β-ol.

Example IX

To a solution of 20 cc. of 4 N methylmagnesium bromide in ether was added, with stirring, a solution of 1 g. of 3-cycloethylenedioxy-19-methyl-5α,6α-oxido-10α-androstan-17β-ol (Cpd. No. 15), in 30 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 200 cc. of a saturated solution of ammonium chloride was added slowly to the cooled mixture which was then stirred for 15 minutes before transfer to a separatory funnel. It was diluted with ethyl acetate, the organic layer was separated, dried and evaported to dryness, thus affording a solid residue.

A solution of the above residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off, washed thoroughly with water and air dried.

A solution of the dry precipitate in 7 cc. of dry pyridine was cooled to −10° C., treated with 0.4 cc. of thionyl chloride and the mixture allowed to stand for 4 minutes at this temperature. Ice-water was added and the crystalline precipitate was filtered, washed and dried, yielding 6β,19-dimethyl-$\Delta^4$-10α-androstan-17β-ol-3-one (Cpd. No. 21).

The compounds Nos. 16 to 20, inclusive, were treated by the above procedure, thus furnishing respectively:

Cpd.
No.
(22)—6β-methyl-19-ethyl-$\Delta^4$-10α-androstan-17β-ol-3-one.
(23)—6β,17α,19-trimethyl-$\Delta^4$-10α-androsten-17β-ol-3-one.
(24)—6β,17α-dimethyl-19-ethyl-$\Delta^4$-10α-androsten-17β-ol-3-one.
(25)—6β,19-dimethyl-17α-ethinyl-$\Delta^4$-10α-androsten-17β-ol-3-one.
(26)—6β-methyl-17α-ethinyl-19-ethyl-$\Delta^4$-10α-androsten-17β-ol-3-one.

Example X 1 g. of 6β,19-dimethyl-$\Delta^4$-10α-androsten-17β-ol-3-one (Cpd. No. 21), was dissolved in 20 cc. of methanol containing 0.2 g. of sodium hydroxide and the mixture was kept for one and a half hours at room temperature, then poured into water and extracted with methylene chloride. Evaporation of the methylene chloride solution and crystallization of the residue from acetone-hexane yielded 6α,19-dimethyl-$\Delta^4$-10α-androsten-17β-ol-3-one (Cpd. No. 27).

Following the same procedure, the compounds Nos. 22 to 26, inclusive, were converted respectively into Cpd.
No.
(28)—6α-methyl-19-ethyl-$\Delta^4$-10α-androsten-17β-ol-3-one.
(29)—6α,17α,19-trimethyl-$\Delta^4$-10α-androsten-17β-ol-3-one.
(30)—6α,17α-dimethyl-19-ethyl-$\Delta^4$-10α-androstan-17β-ol-3-one.
(31)—6α,19-dimethyl-17α-ethinyl-$\Delta^4$-10α-androsten-17β-ol-3-one.
(32)—6α-methyl-17α-ethinyl-19-ethyl-$\Delta^4$-10α-androsten-17β-ol-3-one.

Example XI

Into a suspension of 1 g. of 3-cycloethylene-dioxy-19-methyl-5α-,6α-oxido-10α-androstan-17β-ol (Cpd. No. 15) in 35 g. of glacial acetic acid, was passed a slow stream of dry hydrochloric acid; after 10 minutes all the solid material was dissolved. The gas was passed through the reaction mixture for a total of 5 hours. The solution was concentrated to about one-third its initial volume by distillation under reduced pressure at 35° C., then it was poured into ice-water. The precipitate formed was collected, washed with water to neutrality and dried. Recrystallization from methylene chloride afforded 6α-chloro-19-methyl-$\Delta^4$-10α-androsten-17β-ol - 3 - one (Cpd. No. 33).

The compounds Nos. 16 to 20, inclusive were treated by the above procedure, thus yielding respectively:

Cpd.
No.
(34)—6α-chloro-19-ethyl-$\Delta^4$-10α-androsten-17β-ol-3-one.
(35)—6α-chloro-17α,19-dimethyl-$\Delta^4$-10α-androsten-17β-ol-3-one.
(36)—6α-chloro-17α-methyl-19-ethyl-$\Delta^4$-10α-androsten-17β-ol-3-one.
(37)—6α-chloro-17α-ethinyl-19-methyl-$\Delta^4$-10α-androsten-17β-ol-3-one.
(38)—6α-chloro-17α-ethinyl-19-ethyl-$\Delta^4$-10α-androsten-17β-ol-3-one.

Example XII 2.8 cc. of boron trifluoride etherate was slowly added with stirring to 220 mg. of anhydrous hydrogen fluoride cooled in an acetone-Dry Ice bath.

To a solution of 1 g. of compound No. 15 in 10 cc. of a mixture of equal parts of benzene and ether was added 1.5 cc. of the fluoroboric acid reagent. The mixture was kept for 3-hours at room temperature, then washed four times with water, dried over anhydrous sodium sulfate and the solvent evaporated under reduced pressure. The residue was dissolved in 50 cc. of ethyl acetate and there was added 1 cc. of concentrated hydrochloric acid. The resulting mixture was kept at room temperature for 5 hours, then it was washed abundantly with water. The organic layer was separated, dried over anhydrous sodium sulfate and evaporated to dryness. Recrystallization from acetone-hexane yielded 6α-fluoro-19-methyl-$\Delta^4$-10α-androsten-17β-ol-3-one (Cpd. No. 39).

The compounds Nos. 16 to 20, inclusive were treated by the above procedure, thus yielding respectively:

Cpd.
No.
(40)—6α-fluoro-19-ethyl-$\Delta^4$-10α-androsten-17β-ol-3-one.
(41)—6α-fluoro-17α,19-dimethyl-$\Delta^4$-10α-androsten-17β-ol-3-one.
(42)—6α-fluoro-17α-methyl-19-ethyl-$\Delta^4$-10α-androsten-17β-ol-3-one.
(43)—6α-fluoro-17α-ethinyl-19-methyl-$\Delta^4$-10α-androsten-17β-ol-3-one.
(44)—6α-fluoro-17α-ethinyl-19-ethyl-$\Delta^4$-10α-androsten-17β-ol-3-one.

Example XIII

A suspension of 1 g. of 19-methyl-$\Delta^4$-10α-androsten-17β-ol-3-one (Cpd. No. 3) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 3-ethoxy-19-methyl-$\Delta^{3,5}$-10α-androstadien-17β-ol (Cpd. No. 45).

The compounds Nos. 4, 11, 12, 13 and 14 were treated by the same procedure, thus furnishing respectively:

Cpd.
No.
(46)—3-ethoxy-19-ethyl-$\Delta^{3,5}$-10α-androstadien-17β-ol.
(47)—3-ethoxy-17α,19-dimethyl-$\Delta^{3,5}$-10α-androstadien-17β-ol.
(48)—3-ethoxy-17α-methyl-19-ethyl-$\Delta^{3,5}$-10α-androstadien-17β-ol.
(49)—3-ethoxy-17α-ethinyl-19-methyl-$\Delta^{3,5}$-10α-androstadien-17β-ol.
(50)—3-ethoxy-17α-ethinyl-19-ethyl-$\Delta^{3,5}$-10α-androstadien-17β-ol.

Example XIV

A mixture of 5 g. of 3-ethoxy-19-methyl-$\Delta^{3,5}$-10α-androstadien-17β-ol (Cpd. No. 45) 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-19-methyl-$\Delta^4$-10α-androsten-17β-ol-3-one (Cpd. No. 51).

The compounds Nos. 46 to 50, inclusive were treated by the above procedure, thus yielding respectively:

Cpd.
No.
(52)—6β-chloro-19-ethyl-$\Delta^4$-10α-androsten-17β-ol-3-one.
(53)—6β-chloro-17α,19-dimethyl-$\Delta^4$-10α-androsten-17β-ol-3-one.
(54)—6β-chloro-17α-methyl-19-ethyl-$\Delta^4$-10α-androsten-17β-ol-3-one.
(55)—6β-chloro-17α-ethinyl-19-methyl-$\Delta^4$-10α-androsten-17β-ol-3-one.
(56)—6β-chloro-17α-ethinyl-19-ethyl-$\Delta^4$-10α-androsten-17β-ol-3-one.

Example XV 1 g. of 3-ethoxy-19-methyl-$\Delta^{3,5}$-10α-androstadien-17β-ol (Cpd. No. 45) was dissolved in 25 cc. of dimethyl formamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6β-fluoro-19-methyl-$\Delta^4$-10α-androsten-17β-ol-3-one (Cpd. No. 57).

The compounds Nos. 46 to 50, inclusive were treated by the above procedure, thus yielding respectively:

Cpd.
No.
(58)—6β-fluoro-19-ethyl-$\Delta^4$-10α-androsten-17β-ol-3-one.
(59)—6β-fluoro-17α,19-dimethyl-$\Delta^4$-10α-androsten-17β-ol-3-one.
(60)—6β-fluoro-17α-methyl-19-ethyl-$\Delta^4$-10α-androsten-17β-ol-3-one.
(61)—6β-fluoro-17α-ethinyl-19-methyl-$\Delta^4$-10α-androsten-17β-ol-3-one.
(62)—6β-fluoro-17α-ethinyl-19-ethyl-$\Delta^4$-10α-androsten-17β-ol-3-one.

Example XVI

A solution of 1 g. of 17α-ethinyl-19-methyl-$\Delta^4$-10α-androsten-17β-ol-3-one (Cpd. No. 13) in 40 cc. of pyridine was hydrogenated at 25° C. and 570 mm. in the presence of 400 mg. of pre-hydrogenated 2% palladium calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 17α-vinyl-19-methyl-$\Delta^4$-10α-androsten-17β-ol-3-one (Cpd. No. 63).

Following exactly the same procedure, there were treated the compounds Nos. 14, 25, 26, 31, 32, 37, 38, 43, 44, 55, 56, 61 and 62, yielding respectively:

Cpd.
No.
(64)—17α-vinyl-19-ethyl-$\Delta^4$-10α-androsten-17β-ol-3-one.
(65)—6β,19-dimethyl-17α-vinyl-$\Delta^4$-10α-androsten-17β-ol-3-one.
(66)—6β-methyl-17α-vinyl-19-ethyl-$\Delta^4$-10α-androsten-17β-ol-3-one.
(67)—6α,19-dimethyl-17α-vinyl-$\Delta^4$-10α-androsten-17β-ol-3-one.
(68)—6α-methyl-17α-vinyl-19-ethyl-$\Delta^4$-10α-androsten-17β-ol-3-one.
(69)—6α-chloro-17α-vinyl-19-methyl-$\Delta^4$-10α-androsten-17β-ol-3-one.

Cpd.
No.—Continued
(70)—6α-chloro-17α-vinyl-19-ethyl-Δ⁴-10α-androsten-17β-ol-3-one.
(71)—6α-fluoro-17α-vinyl-19-methyl-Δ⁴-10α-androsten-17β-ol-3-one.
(72)—6α-fluoro-17α-vinyl-19-ethyl-Δ⁴-10α-androsten-17β-ol-3-one.
(73)—6β-chloro-17α-vinyl-19-methyl-Δ⁴-10α-androsten-17β-ol-3-one.
(74)—6β-chloro-17α-vinyl-19-ethyl-Δ⁴-10α-androsten-17β-ol-3-one.
(75)—6β-fluoro-17α-vinyl-19-methyl-Δ⁴-10α-androsten-17β-ol-3-one.
(76)—6β-fluoro-17α-vinyl-19-ethyl-Δ⁴-10α-androsten-17β-ol-3-one.

Example XVII

A suspension of 1 g. of 19-methyl-Δ⁴-10α-androsten-17β-ol-3-one (Cpd. No. 3) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes 0.8 cc. of pyridine were added and then water. The formed precipitate was collected by filtration, water washed and air dried. Recrystallization from acetone-hexane afforded 3-ethoxy-19-methyl-Δ³,⁵-androstadien-17β-ol, identical with compound No. 45 obtained in Example IX.

A solution of 1 g. of the latter compound in 20 cc. of tetrahydrofuran was cooled to 0° C. and there were added 1.05 molar equivalents of 2,3-dichloro 5,6-dicyano 1,4-benzoquinone and 100 mg. of p-toluenesulfonic acid. The resulting mixture was further stirred at 0° C. for 30 minutes. The precipitated 2,3-dichloro 5,6-dicyano hydroquinone was filtered off and 100 cc. of methylene chloride were added to the filtrate.

The organic solution was washed with 5% aqueous sodium hydroxide solution until the washings were colorless, then with water to neutrality, dried over anhydrous sodium sulfate and evaporated to dryness. Crystallization from acetone-hexane gave 19-methyl-Δ⁴,⁶-10α androstadien-17β-ol-3-one (Cpd. No. 77).

The compounds Nos. 4, 11, 12, 13, and 14, were treated following the same procedure, thus yielding respectively:
Cpd.
No.
(78)—19-ethyl-Δ⁴,⁶-10α-androstadien-17β-ol-3-one.
(79)—17α,19-dimethyl-Δ⁴,⁶-10α-androstadien-17β-ol-3-one.
(80)—17α-methyl-19-ethyl-Δ⁴,⁶-10α-androstadien-17β-ol-3-one.
(81)—17α-ethinyl-19-methyl-Δ⁴,⁶-10α-androstadien-17β-ol-3-one.
(82)—17α-ethinyl-19-ethyl-Δ⁴,⁶-10α-androstadien-17β-ol-3-one.

Example XVIII

The compounds of Nos. 21 to 26, inclusive, were treated in accordance with the preceding example, thus affording respectively:
Cpd.
No.
(83)—6,19-dimethyl-Δ⁴,⁶-10α-androstadien-17β-ol-3-one.
(84)—6-methyl-19-ethyl-Δ⁴,⁶-10α-androstadien-17β-ol-3-one.
(85)—6,17α,19-trimethyl-Δ⁴,⁶-10α-androstadien-17β-ol-3-one.
(86)—6,17α-dimethyl-19-ethyl-Δ⁴,⁶-10α-androstadien-17β-ol-3-one.
(87)—6,19-dimethyl-17α-ethinyl-Δ⁴,⁶-10α-androstadien-17β-ol-3-one.
(88)—6-methyl-17α-ethinyl-19-ethyl-Δ⁴,⁶-10α-androstadien-17β-ol-3-one.

Example XIX

Upon treatment of compounds Nos. 33 to 44, inclusive, by the procedure of Example XVII, there were respectively produced:
Cpd.
No.
(89)—6-chloro-19-methyl-Δ⁴,⁶-10α-androstadien-17β-ol-3-one.
(90)—6-chloro-19-ethyl-Δ⁴,⁶-10α-androstadien-17β-ol-3-one.
(91)—6-chloro-17α-19-dimethyl-Δ⁴,⁶-10α-androstadien-17β-ol-3-one.
(92)—6-chloro-17α-methyl-19-ethyl-Δ⁴,⁶-10α-androstadien-17β-ol-3-one.
(93)—6-chloro-17α-ethinyl-19-methyl-Δ⁴,⁶-10α-androstadien-17β-ol-3-one.
(94)—6-chloro-17α-ethinyl-19-ethyl-Δ⁴,⁶-10α-androstadien-17β-ol-3-one.
(95)—6-fluoro-19-methyl-Δ⁴,⁶-10α-androstadien-17β-ol-3-one.
(96)—6-fluoro-19-ethyl-Δ⁴,⁶-10α-androstadien-17β-ol-3-one.
(97)—6-fluoro-17α-19-dimethyl-Δ⁴,⁶-10α-androstadien-17β-ol-3-one.
(98)—6-fluoro-17α-methyl-19-ethyl-Δ⁴,⁶-10α-androstadien-17β-ol-3-one.
(99)—6-fluoro-17α-ethinyl-19-methyl-Δ⁴,⁶-10α-androstadien-17β-ol-3-one.
(100)—6-fluoro-17α-ethinyl-19-ethyl-Δ⁴,⁶-10α-androstadien-17β-ol-3-one.

Example XX

The compounds Nos. 63 and 64 were treated according to Example XVII, thus furnishing respectively: 17α-vinyl-19-methyl-Δ⁴,⁶-10α-androstadien-17β-ol-3-one (Cpd. No. 101) and 17α-vinyl-19-ethyl-Δ⁴,⁶-10α-androstadien-17β-ol-3-one (Cpd. No. 102).

Example XXI

A mixture of 500 mg. of 19-methyl-Δ⁴-10α-androsten-17β-ol-3-one (Cpd. No. 3), 10 cc. of dioxane and 350 mg. of 2,3-dichloro 5,6-dicyano 1,4-benzoquinone was refluxed for 10 hours. It was then cooled, the 2,3-dichloro-5,6-dicyano 1,4-benzohydroquinone formed during the reaction filtered off, and the filtrate evaporated to dryness. The residue was dissolved in acetone and filtered through 10 g. of alumina. Crystallization from acetone-hexane gave 19-methyl-Δ¹,⁴-10α-androstadien-17β-ol-3-one (Cpd. No. 103).

The compounds Nos. 4, 11, 12, 13 and 14 were treated in accordance with the above procedure, thus furnishing respectively:
Cpd.
No.
(104)—19-ethyl-Δ¹,⁴-10α-androstadien-17β-ol-3-one.
(105)—17α,19-dimethyl-Δ¹,⁴-10α-androstadien-17β-ol-3-one.
(106)—17α-methyl-19-ethyl-Δ¹,⁴-10α-androstadien-17β-ol-3-one.
(107)—17α-ethinyl-19-methyl-Δ¹,⁴-10α-androstadien-17β-ol-3-one.
(108)—17α-ethinyl-19-ethyl-Δ¹,⁴-10α-androstadien-17β-ol-3-one.

Example XXII

The compounds Nos. 21 to 32, inclusive, were treated in accordance with the preceding example, thus affording respectively:
Cpd.
No.
(109)—6β,19-dimethyl-Δ¹,⁴-10α-androstadien-17β-ol-3-one.
(110)—6β-methyl-19-ethyl-Δ¹,⁴-10α-androstadien-17β-ol-3-one.

Cpd.
No.—Continued
(111)—6β,17α,19-trimethyl-Δ$^{1,4}$-10α-androstadien-17β-ol-3-one.
(112)—6β,17α-dimethyl-19-ethyl-Δ$^{1,4}$-10α-androstadien-17β-ol-3-one.
(113)—6β,19-dimethyl-17α-ethinyl-Δ$^{1,4}$-10α-androstadien-17β-ol-3-one.
(114)—6β-methyl-17α-ethinyl-19-ethyl-Δ$^{1,4}$-10α-androstadien-17β-ol-3-one.
(115)—6α,19-dimethyl-Δ$^{1,4}$-10α-androstadien-17β-ol-3-one.
(116)—6α-methyl-19-ethyl-Δ$^{1,4}$-10α-androstadien-17β-ol-3-one.
(117)—6α,17α,19-trimethyl-Δ$^{1,4}$-10α-androstadien-17β-ol-3-one.
(118)—6α,17α-dimethyl-19-ethyl-Δ$^{1,4}$-10α-androstadien-17β-ol-3-one.
(119)—6α,19-dimethyl-17α-ethinyl-Δ$^{1,4}$-10α-androstadien-17β-ol-3-one.
(120)—6α-methyl-17α-ethinyl-19-ethyl-Δ$^{1,4}$-10α-androstadien-17β-ol-3-one.

*Example XXIII*

Upon treatment of compounds Nos. 33 to 44, inclusive, by the procedure of Example XXI, there were respectively produced:

Cpd.
No.
(121)—6α-chloro-19-methyl-Δ$^{1,4}$-10α-androstadien-17β-ol-3-one.
(122)—6α-chloro-19-ethyl-Δ$^{1,4}$-10α-androstadien-17β-ol-3-one.
(123)—6α-chloro-17α,19-dimethyl-Δ$^{1,4}$-10α-androstadien-17β-ol-3-one.
(124)—6α-chloro-17α-methyl-19-ethyl-Δ$^{1,4}$-10α-androstadien-17β-ol-3-one.
(125)—6α-chloro-17α-ethinyl-19-methyl-Δ$^{1,4}$-10α-androstadien-17β-ol-3-one.
(126)—6α-chloro-17α-ethinyl-19-ethyl-Δ$^{1,4}$-10α-androstadien-17β-ol-3-one.
(127)—6α-fluoro-19-methyl-Δ$^{1,4}$-10α-androstadien-17β-ol-3-one.
(128)—6α-fluoro-19-ethyl-Δ$^{1,4}$-10α-androstadien-17β-ol-3-one.
(129)—6α-fluoro-17α,19-dimethyl-Δ$^{1,4}$-10α-androstadien-17β-ol-3-one.
(130)—6α-fluoro-17α-methyl-19-ethyl-Δ$^{1,4}$-10α-androstadien-17β-ol-3-one.
(131)—6α-fluoro-17α-ethinyl-19-methyl-Δ$^{1,4}$-10α-androstadien-17β-ol-3-one.
(132)—6α-fluoro-17α-ethinyl-19-ethyl-Δ$^{1,4}$-10α-androstadien-17β-ol-3-one.

*Example XXIV*

The compounds Nos. 63 and 64 were treated according to Example XXI, thus furnishing respectively: 17α-vinyl-19-methyl-Δ$^{1,4}$-10α-androstadien-17β-ol-3-one (Cpd. No. 133) and 17α-vinyl-19-ethyl-Δ$^{1,4}$-10α-androstadien-17β-ol-3-one (Cpd. No. 134).

*Example XXV*

The compounds Nos. 77 to 88, inclusive, upon treatment by the procedure of Example XXI, afforded respectively:

Cpd.
No.
(135)—19-methyl-Δ$^{1,4,6}$-10α-androstatrien-17β-ol-3-one.
(136)—19-ethyl-Δ$^{1,4,6}$-10α-androstatrien-17β-ol-3-one.
(137)—17α,19-dimethyl-Δ$^{1,4,6}$-10α-androstatrien-17β-ol-3-one.
(138)—17α-methyl-19-ethyl-Δ$^{1,4,6}$-10α-androstatrien-17β-ol-3-one.

Cpd.
No.—Continued
(139)—17α-ethinyl-19-methyl-Δ$^{1,4,6}$-10α-androstatrien-17β-ol-3-one.
(140)—17α-ethinyl-19-ethyl-Δ$^{1,4,6}$-10α-androstatrien-17β-ol-3-one.
(141)—6,19-dimethyl-Δ$^{1,4,6}$-10α-androstatrien-17β-ol-3-one.
(142)—6-methyl-19-ethyl-Δ$^{1,4,6}$-10α-androstatrien-17β-ol-3-one.
(143)—6,17α,19-trimethyl-Δ$^{1,4,6}$-10α-androstatrien-17β-ol-3-one.
(144)—6,17α-dimethyl-19-ethyl-Δ$^{1,4,6}$-10α-androstatrien-17β-ol-3-one.
(145)—6,19-dimethyl-17α-ethinyl-Δ$^{1,4,6}$-10α-androstatrien-17β-ol-3-one.
(146)—6-methyl-17α-ethinyl-19-ethyl-Δ$^{1,4,6}$-10α-androstatrien-17β-ol-3-one.

*Example XXVI*

The compounds Nos. 101 and 102 of Example XX were treated in accordance with Example XXI, thus yielding respectively: 17α-vinyl-19-methyl-Δ$^{1,4,6}$-10α-androstatrien-17β-ol-3-one (Cpd. No. 147) and 17α-vinyl-19-ethyl-Δ$^{1,4,6}$-10α-androstatrien-17β-ol-3-one (Cpd. No. 148).

*Example XXVII*

The compounds Nos. 65 to 76, inclusive, were treated in accordance with Example XVII, thus affording the corresponding Δ$^{4,6}$-pregnadiene derivatives.

*Example XXVIII*

A mixture of 1 g. of 6β,19-dimethyl-Δ$^{4}$-10α-androsten-17β-ol-3-one (Cpd. No. 21), 4 cc. of pyridine and 2 cc. of propionic anhydride was kept at room temperature overnight, poured into ice water, the formed precipitate was filtered, washed with water and dried. Crystallization from acetone-hexane gave 6β,19-dimethyl-Δ$^{4}$-10α-androsten-17β-ol-3-one propionate (Cpd. No. 149).

Upon esterification of compounds Nos. 22, 27, 28, 33, 34, 39, 40, 51, 52, 57, 58, 77, 78, 83, 89, 95, 103, 109, 121 and 135 by the above procedure, there were respectively obtained:

Cpd.
No.
(150)—6β-methyl-19-ethyl-Δ$^{4}$-10α-androsten-17β-ol-3-one propionate.
(151)—6α,19-dimethyl-Δ$^{4}$-10α-androsten-17β-ol-3-one propionate.
(152)—6α-methyl-19-ethyl-Δ$^{4}$-10α-androsten-17β-ol-3-one propionate.
(153)—6α-chloro-19-methyl-Δ$^{4}$-10α-androsten-17β-ol-3-one propionate.
(154)—6α-chloro-19-ethyl-Δ$^{4}$-10α-androsten-17β-ol-3-one propionate.
(155)—6α-fluoro-19-methyl-Δ$^{4}$-10α-androsten-17β-ol-3-one propionate.
(156)—6α-fluoro-19-ethyl-Δ$^{4}$-10α-androsten-17β-ol-3-one propionate.
(157)—6β-chloro-19-methyl-Δ$^{4}$-10α-androsten-17β-ol-3-one propionate.
(158)—6β-chloro-19-ethyl-Δ$^{4}$-10α-androsten-17β-ol-3-one propionate.
(159)—6β-fluoro-19-methyl-Δ$^{4}$-10α-androsten-17β-ol-3-one propionate.
(160)—6β-fluoro-19-ethyl-Δ$^{4}$-10α-androsten-17β-ol-3-one propionate.
(161)—19-methyl-Δ$^{4,6}$-10α-androstadien-17β-ol-3-one propionate.
(162)—10-ethyl-Δ$^{4,6}$-10α-androstadien-17β-ol-3-one propionate.
(163)—6,19-dimethyl-Δ$^{4,6}$-10α-androstadien-17β-ol-3-one propionate.
(164)—6-chloro-19-methyl-Δ$^{4,6}$-10α-androstadien-17β-ol-3-one propionate.

Cpd. No.—Continued (165)—6-fluoro-19-methyl-$\Delta^{4,6}$-10α-androstadien-17β-ol-3-one propionate.
(166)—19-methyl-$\Delta^{1,4}$-10α-androstadien-17β-ol-3-one propionate.
(167)—6β,19-dimethyl-$\Delta^{1,4}$-10α-androstadien-17β-ol-3-one propionate.
(168)—6α-chloro-19-methyl-$\Delta^{1,4}$-10α-androstadien-17β-ol-3-one propionate.
(169)—19-methyl-$\Delta^{1,4,6}$-10α-androstatrien-17β-ol-3-one propionate.

*Example XXIX*

The starting compounds of the preceding example were treated in accordance with that example, except that propionic anhydride was substituted by caproic anhydride, undecenoic anhydride and cyclopenylpropionic anhydride, thus affording respectively the corresponding caproates, undecenoates and cyclopentylpropionates of said starting compounds.

*Examples XXX*

To a solution of 5 g. of 17α,19-dimethyl-$\Delta^4$-10α-androsten-17β-ol-3-one (Cpd. No. 11) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α,19-dimethyl-$\Delta^4$-10α-androsten-17β-ol-3-one caproate (Cpd. No. 170)

Following exactly the same procedure there were treated the compounds Nos. 12, 13, 14, 29, 37, 42, 67, 72, 79, 87, 94, 106, 119, 134, 137, 140 and 147, thus furnishing respectively:

Cpd. No.
(171)—17α-methyl-19-ethyl-$\Delta^4$-10α-androsten-17β-ol-3-one caproate.
(172)—17α-ethinyl-19-methyl-$\Delta^4$-10α-androsten-17β-ol-3-one caproate.
(173)—17α-ethinyl-19-ethyl-$\Delta^4$-10α-androsten-17β-ol-3-one caproate.
(174)—6α,17α,19-trimethyl-$\Delta^4$-10α-androsten-17β-ol-3-one caproate.
(175)—6α-chloro-17α-ethinyl-19-methyl-$\Delta^4$-10α-androsten-17β-ol-3-one caproate.
(176)—6α-fluoro-17α-methyl-19-ethyl-$\Delta^4$-10α-androsten-17β-ol-3-one caproate.
(177)—6α,19-dimethyl-17α-vinyl-$\Delta^4$-10α-androsten-17β-ol-3-one caproate.
(178)—6α-fluoro-17α-vinyl-19-ethyl-$\Delta^4$-10α-androsten-17β-ol-3-one caproate.
(179)—17α,19-dimethyl-$\Delta^{4,6}$-10α-androstadien-17β-ol-3-one caproate.
(180)—6,19-dimethyl-17α-ethinyl-$\Delta^{4,6}$-10α-androstadien-17β-ol-3-one caproate.
(181)—6-chloro-17α-ethinyl-19-ethyl-$\Delta^{4,6}$-10α-androstadien-17β-ol-3-one caproate.
(182)—17α-methyl-19-ethyl-$\Delta^{1,4}$-10α-androstadien-17β-ol-3-one caproate.
(183)—6α,19-dimethyl-17α-ethinyl-$\Delta^{1,4}$-10α-androstadien-17β-ol-3-one caproate.
(184)—17α-vinyl-19-ethyl-$\Delta^{1,4}$-10α-androstadien-17β-ol-3-one caproate.
(185)—17α,19-dimethyl-$\Delta^{1,4,6}$-10α-androstatrien-17β-ol-3-one caproate.
(186)—17α-ethinyl-19-ethyl-$\Delta^{1,4,6}$-10α-androstatrien-17β-ol-3-one caproate.
(187)—17α-vinyl-19-methyl-$\Delta^{1,4,6}$-10α-androstatrien-17β-ol-3-one caproate.

*Example XXXI*

The starting compounds of the preceding example were treated in accordance with that example, except that caproic anhydride was substituted by acetic anhydride, propionicanhydride and enanthic anhydride, thus furnishing respectively the corresponding acetates, propionates and enanthates of said starting compounds.

*Example XXXII*

The compounds Nos. 1 to 4, inclusive, were treated according to Example XXVIII, thus giving respectively:

Cpd. No.
(188)—19-methyl-5β,10α-androstan-17β-ol-3-one propionate.
(189)—19-ethyl-5β,10α-androstan-17β-ol-3-one propionate.
(190)—19-methyl-$\Delta^4$-10α-androsten-17β-ol-3-one propionate.
(191)—19-ethyl-$\Delta^4$-10α-androsten-17β-ol-3-one propionate.

*Example XXXIII*

The compound No. 1 was successively treated according to Examples III, IV, and V, thus giving respectively:

Cpd. No.
(192)—3-cycloethylenedioxy-19-methyl-5β,10α-androstan-17β-ol.
(193)—3-cycloethylenedioxy-19-methyl-5β,10α-androstan-17-one.
(194)—3-cycloethylenedioxy-17α,19-dimethyl-5β,10α-androstan-17β-ol.

*Example XXXIV*

The compound No. 2, was successively treated following the procedures described in Examples III, IV and V, yielding respectively:

Cpd. No.
(195)—3-cycloethylenedioxy-19-ethyl-5β,10α-androstan-17β-ol.
(196)—3-cycloethylenedioxy-19-ethyl-5β,10α-androstan-17-one.
(197)—3-cycloethylenedioxy-17α-methyl-19-ethyl-5β,10α-androstan-17β-ol.

*Example XXXV*

The compounds Nos. 193 and 196, were treated according to Example VI, giving respectively:

3-cycloethylenedioxy-17α-ethinyl-19-methyl-5β,10α-androstan-17β-ol (Cpd. No. 198) and 3-cycloethylenedioxy-17α-ethinyl-19-ethyl-5β,10α-androstan-17β-ol (Cpd. No. 199).

*Example XXXVI*

The compounds Nos. 194, 197, 198 and 199 were treated according to Example VII, yielding respectively:

Cpd. No.
(200)—17α,19-dimethyl-5β,10α-androstan-17β-ol-3-one.
(201)—17α-methyl-19-ethyl-5β,10α-androstan-17β-ol-3-one.
(202)—17α-ethinyl-19-methyl-5β,10α-androstan-17β-ol-3-one.
(203)—17α-ethinyl-19-ethyl-5β,10α-androstan-17β-ol-3-one.

*Example XXXVII*

The compounds Nos. 202 and 203 were treated according to Example XVI, thus yielding respectively:

17α-vinyl-19-methyl-5β,10α-androstan-17β-ol- 3-one (Cpd. No. 204) and 17α - vinyl - 19 - ethyl - 5β,10α-androstan-17β-ol-3-one (Cpd. No. 205).

*Example XXXVIII*

The compounds Nos. 200 to 205, inclusive, were treated according to Example XXX, thus furnishing respectively:

Cpd.
No.
(206)—17α,19 - dimethyl - 5β,10α - androstan - 17β - ol-3-one caproate.
(207)—17α - methyl - 19 - ethyl - 5β,10α - androstan-17β-ol-3-one caproate.
(208)—17α - ethinyl - 19 - methyl - 5β,10α - androstan-17β-ol-3-one caproate.
(209)—17α - ethinyl - 19 - ethyl - 5β,10α - androstan-17β-ol-3-one caproate.
(210)—17α - vinyl - 19 - methyl - 5β,10α - androstan-17β-ol-3-one caproate.
(211)—17α - vinyl - 19 - ethyl - 5β,10α - androstan - 17β-ol-3-one caproate.

*Example XXXIX*

The starting compounds of the preceding example were treated following the procedure described in that example except that caproic anhydride was substituted by acetic anhydride, enanthic anhydride and undecenoic anhydride, thus yielding respectively the corresponding acetates, enanthates and undecenoates.

I claim:
1. A compound of the following formula:

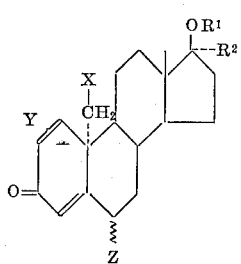

wherein $R^1$ is selected from the group consisting of hydrogen and a hydrocarbon carboxylic acyl group of less than 12 carbon atoms; $R^2$ is a member of the group consisting of hydrogen, lower alkyl, lower alkenyl and lower alkinyl; Z is selected from the group consisting of hydrogen, α-methyl, β-methyl, α-chlorine, β-chlorine, α-fluorine and β-fluorine; Y is a member of the group consisting of a double bond and a saturated linkage between C–1 and C–2; and X is a lower alkyl group containing at least two carbon atoms.

2. 19-ethyl-Δ⁴-10α-androsten-17β-ol-3-one.
3. 17α-vinyl-19-methyl-Δ⁴-10α-androsten-17β-ol-3-one.
4. 17α-vinyl-19-ethyl-Δ⁴-10α-androsten-17β-ol-3-one.
5. 17α-methyl-19-ethyl-Δ⁴-10α-androsten-17β-ol-3-one.
6. 17α-ethinyl-19-ethyl-Δ⁴-10α-androsten-17β-ol-3-one.
7. 6α,17α,19-trimethyl-Δ⁴-10α-androsten-17β-ol-3-one.
8. 6α-chloro-17α-ethinyl-19 - methyl-Δ⁴-10α-androsten-17β-ol-3-one.
9. 6α - fluoro - 17α-methyl-19-ethyl-Δ⁴-10α-androsten-17β-ol-3-one.
10. 6α,19 - dimethyl - 17α-vinyl-Δ⁴-10α-androsten-17β-ol-3-one.
11. 6α - fluoro - 17α-vinyl-19-ethyl-Δ⁴-10α-androsten-17β-ol-3-one.
12. 17α - methyl - 19-ethyl-Δ¹,⁴-10α-androstadien-17β-ol-3 one.
13. 6α,19 - dimethyl-17α-ethinyl-Δ¹,⁴-10α-androstadien-17β-ol-3-one.
14. 17α - vinyl - 19-ethyl-Δ¹,⁴-10α-androstadien-17β-ol-3-one.
15. A compound of the following formula:

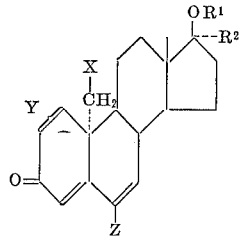

wherein $R^1$ is selected from the group consisting of hydrogen and a hydrocarbon carboxylic acyl group of less than 12 carbon atoms; $R^2$ is a member of the group consisting of hydrogen, lower alkyl, lower alkenyl and lower alkinyl; Z is selected from the group consisting of hydrogen, methyl, chlorine and fluorine; Y is a member of the group consisting of a double bond and a saturated linkage between C–1 and C–2; and X is a lower alkyl group containing at least two carbon atoms.

16. 17α,19 - dimethyl - Δ⁴,⁶-10α - androstadien-17β-ol-3-one.
17. 6,19 - dimethyl - 17α-ethinyl-Δ⁴,⁶-10α-androstadien-17β-ol-3-one.
18. 6 - chloro - 17α-ethinyl-19-ethyl-Δ⁴,⁶-10α-androstadien-17β-ol-3-one.
19. A compound of the following formula:

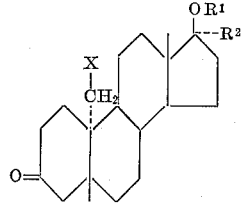

wherein $R^1$ is selected from the group consisting of hydrogen and a hydrocarbon carboxylic acyl group of less than 12 carbon atoms; $R^2$ is a member of the group consisting of hydrogen, lower alkyl, lower alkenyl and lower alkinyl; and X is a lower alkyl group.

20. 19-methyl-5β,10α-androstan-17β-ol-3-one.
21. 19-ethyl-5β,10α-androstan-17α-ol-3-one.
22. 17α,19-dimethyl-5β,10α-androstan-17β-ol-3-one.
23. 17α - ethinyl-19-methyl-5β,10α-androstan-17β-ol-3-one.

References Cited by the Examiner

Westerhof et al.: "Rec. Trav. Chim." (1960), vol. 79, pages 794–799.

LEWIS GOTTS, *Primary Examiner.*